W. A. BROWNLEE.
OVERHEAD TRACK SUSPENSION MEANS AND LOAD CARRIAGE.
APPLICATION FILED FEB. 10, 1921.
1,391,993.
Patented Sept. 27, 1921.
2 SHEETS—SHEET 2.
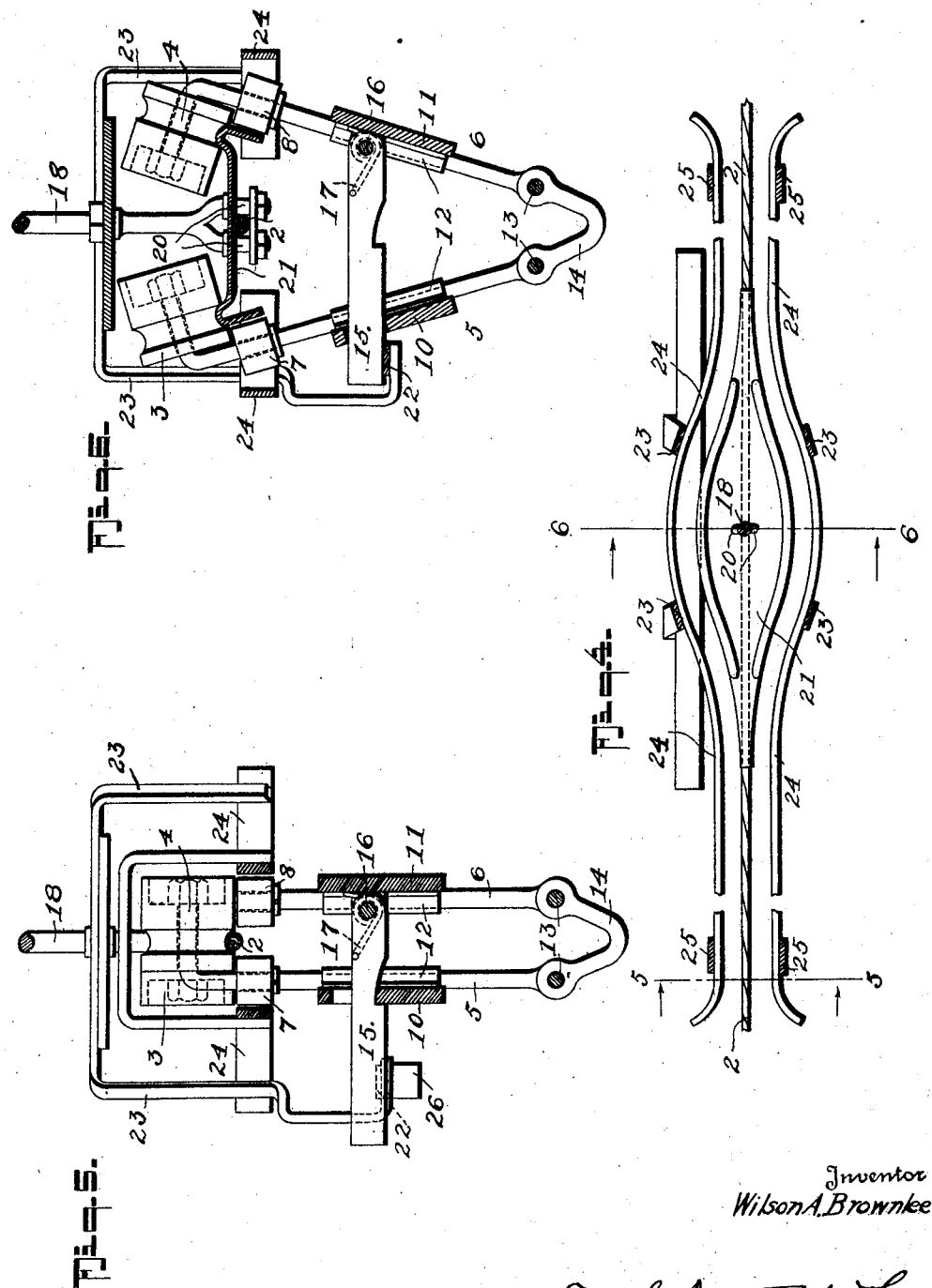
Inventor
Wilson A. Brownlee.
By Fred G. Dieterich
Attorneys

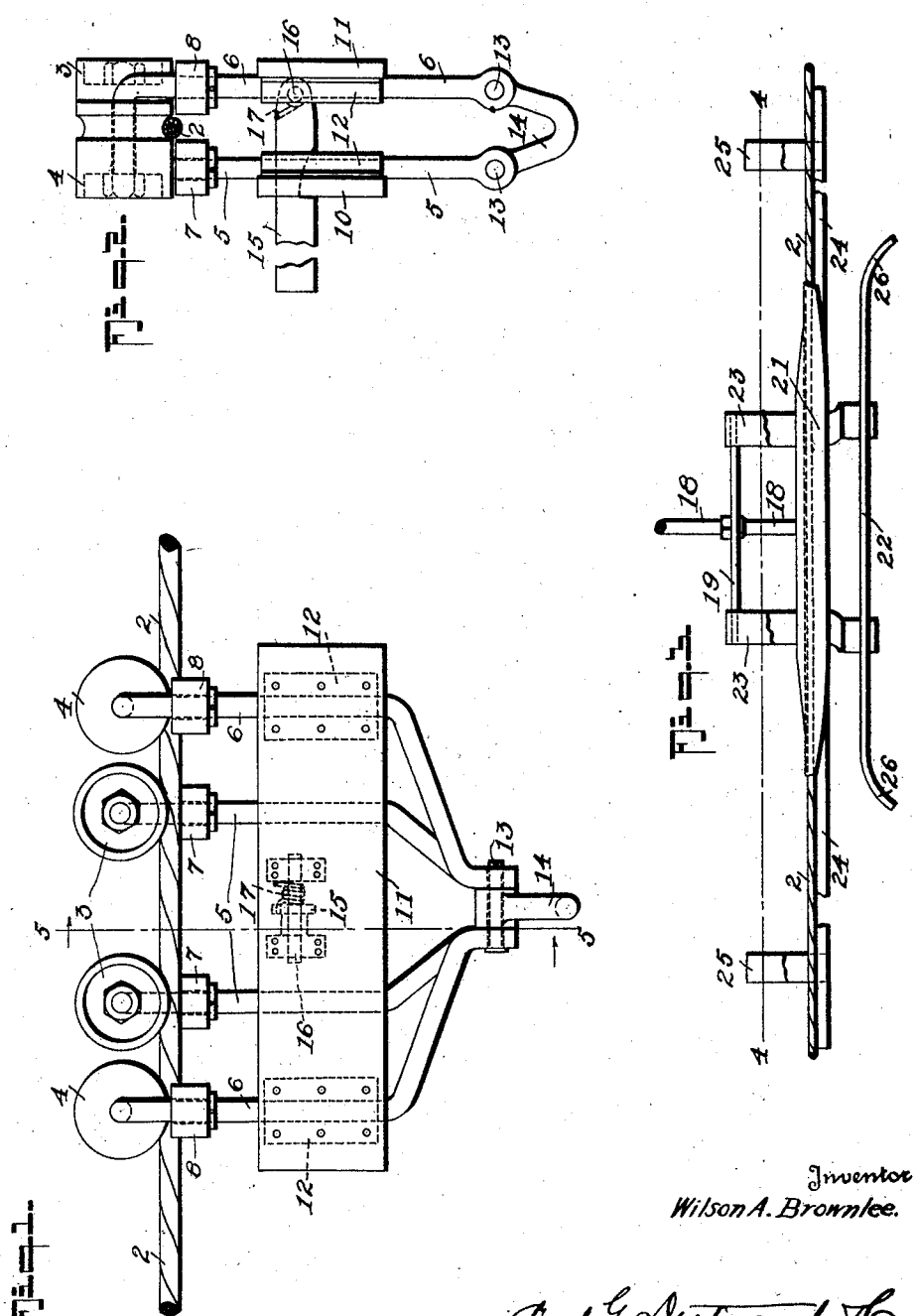

UNITED STATES PATENT OFFICE.

WILSON A. BROWNLEE, OF QUATHIASKI COVE, BRITISH COLUMBIA, CANADA.

OVERHEAD-TRACK SUSPENSION MEANS AND LOAD-CARRIAGE.

1,391,993. Specification of Letters Patent. Patented Sept. 27, 1921.

Application filed February 10, 1921. Serial No. 443,966.

*To all whom it may concern:*

Be it known that I, WILSON A. BROWNLEE, a citizen of the Dominion of Canada, residing at Quathiaski Cove, in the Province of British Columbia, Canada, have invented certain new and useful Improvements in Overhead - Track Suspension Means and Load-Carriages, of which the following is a specification.

This invention relates to a means for suspending a wire rope track line from its supports, and to a load carriage designed to pass such suspending means.

In all devices of this character with which I am acquainted the track rope is suspended from one side only, and the load carriage in order to pass such suspending means is connected to its track sheaves from the opposite side. This necessitates an exceptionally heavy suspension means for the track rope, and a correspondingly heavy means for connecting the carriage to its track sheaves.

In the device, which is the subject of this application, the track rope suspending means is in the vertical plane of the track rope, and means is provided for conducting the track sheaves past such medial suspension; and the load carriage is connected to its track sheaves from opposite sides, with provision releasing the sheaves of one side from those of the other side that they pass on each side of the medial suspension means of the track rope.

The invention is fully described in the following specification, reference being made to the drawings by which it is accompanied, in which:

Figure 1 is a side elevation of the load carriage on the track rope.

Fig. 2 is an end elevation of the same.

Fig. 3 is a side elevation of the track rope suspending means.

Fig. 4, a sectional plan of the same on the line 4—4 in Fig. 3.

Fig. 5 is a sectional end elevation of the track rope suspending means with the load carriage on the track rope, the suspending means of the track rope being a section on the line 5—5 in Fig. 4, and the carriage a section on the line 5—5 in Fig. 1; the track sheaves of the carriage have not been released to laterally extend and clear the suspension means of the track rope.

Fig. 6 is a section of the track rope suspension means on the line 6—6 in Fig. 4, showing the track sheaves of the carriage as released and extended to pass the suspension means of the track rope.

In these drawings 2 represents the track rope which is suspended from suitable supports in a manner to be described later. The load carriage is supported from this track rope 2 on four roller sheaves 3 and 4, the axle pins of which project laterally from rods 5 and 6 which suspend the carriage, the rods 5 passing down one side of the track rope, while those 6 pass down the opposite side.

The rods 5 and 6 of each pair are maintained upright and at the required distance apart by plates 10 and 11 secured to them by clamps 12. From the plate connection these rods of each side are turned toward one another and are pin-connected at 13 to a yoke 14 from which the load may be suspended.

The rollers 3 and 4 are cylindrical and are grooved adjacent their supporting rods, the cylindrical portion extending from the groove to beyond the supporting rods on the other side of the track rope, the reason for which will be explained later, and on each supporting rod 5 and 6 adjacent the roller sheaves 3 and 4 are mounted rollers 7 and 8.

The upper ends of the rods which carry the roller sheaves 3 and 4 are thus free to move apart and from the track rope 2, pivoting on the pins 13 which connect them to the yoke 14. They are normally retained together, with their grooves in the plane of the track rope, by a latch member 15 pivotally mounted at 16 to one of the plates 11 and notched to engage the edge of the other plate 10 through an aperture in which it passes. The end of the latch member 15 extends beyond the plate 10 for a reason to be explained later.

The track rope 2 is suspended from supports at the required intervals apart on suspension rods 18, being clamped by the bifurcated ends 20 of the rod 18 to an ovate track plate 21, the ends of which are pointed to converge to the line of the track rope 2. The edges of this track plate are downwardly flanged, as shown in Fig. 6, with a raised ridge at the bend of the flange. This raised ridge is designed to receive the grooves of the rollers 3 and 4 and carry the rollers laterally apart around the connection of it to the suspension rod 18.

Before the rollers 3 and 4 can move laterally apart to follow the edges of the track plate 21, the latch 15 requires to be lifted to release the plates 10 and 11 from one another.

This is attained by a release bar 22 carried along one side of the track plate on stirrup straps 23 secured across an ovate plate 19 suitably carried on the suspension rods 18 above the track plate 21. This release bar extends beyond the ends of the track plate 2 and at each end is turned down as at 26 to engage and lift the latch lever 15, and set the rods 5 and 6 free to move apart and allow the rollers 3 and 4 to follow the edge ridge of the track plate 21. At the other end of the track plate, when the rollers have been brought together on the line of the track 2, the latch lever 15 will lower as it leaves the bar 22 and will again retain the rods 5 and 6 in their normal vertical position with their grooves in the line of the track rope.

The straps 23 carry guard plates 24 on each side, which guard plates are produced beyond each end of the track plate and are connected together by stirrups 25.

In use, the sheaves 3 and 4 will, while running on the track rope 2 between its places of suspension, be retained with their grooves in alinement with one another, and the carriage being supported on both sides from the sheaves cannot jump the track.

As the carriage approaches a place of suspension, and after it enters between the guard strips 24, the end of the latch lever 15 will engage the release bar 22 and will be lifted to free the side plate 10 of the carriage from the notch in the latch lever. The track wheels 3 and 4 will then be free to move laterally apart following the opposite edges of the track plate 21 past the medial suspension rod 18. After passing the suspension rod the sheaves 3 and 4 will again converge to the alinement of the track rope 2 and the latch lever 15 after it passes the end of the release bar 22 is free to fall, under gravity and the action of its spring 17, and will again secure the track sheaves 3 and 4 with their grooves in alinement with the track rope 2 before the carriage leaves the protection of the guard strips 24.

Having now particularly described my invention, I hereby declare that what I claim as new and desire to be protected in by Letters Patent, is:

1. In an overhead wire rope system, the combination with the track rope, track plates secured to the track rope at the required intervals apart, the edges of each of which plates form tracks around each side from and to the line of the track rope, a suspension rod secured to the middle of each track plate from the overhead supports, sheaves grooved to fit the track rope, a carriage suspended from opposite sides of adjacent sheaves, means for retaining the sheaves together with their grooves in alinement with the track rope, means coöperative with the approach of the carriage to the suspension track plate for releasing the track sheaves from their retaining means and permitting them to move apart around the opposite sides of the track plate, and means after leaving the track plate for again connecting the sheaves of each side together.

2. In an overhead wire rope system, the combination with the track rope, track plates secured to the track rope at the required intervals apart, the edges of each of which plates form tracks around each side from and to the line of the track rope, a suspension rod secured to the middle of each track plate from the overhead supports, sheaves grooved to fit the track rope, a carriage suspended from opposite sides of adjacent sheaves, means for retaining the sheaves together with their grooves in alinement with the track rope, means coöperative with the approach of the carriage to the suspension track plate for releasing the track sheaves from their retaining means and permitting them to move apart around the opposite sides of the track plate, means after leaving the track plate for again connecting the sheaves of each side together, and means preventing the track sheaves from leaving the track while passing around the track plate.

3. In an overhead wire rope system, the combination with a track rope, suspension rods secured at intervals apart to suitable overhead supports, a track plate secured to each suspension rod and to the track rope, the edges of which plate are downwardly flanged and upwardly turned at the bend of the flange to leave a raised track from the track rope at each end around each side of the suspension rod, track sheaves grooved to fit the track rope, carriage side frames suspended from opposite sides of adjacent sheaves, a load bearing yoke pivotally connected to the lower part of each side frame, a latch lever pivotally mounted on one side frame and produced through an aperture in the other, said lever notched to engage the edge of the aperture through which it passes, means connected to the track plate for effecting release of the latch whereby the sheaves may separate and pass around the edges of the track plate past the suspension rod.

4. In an overhead wire rope system, means for suspending the track rope from its supports, said means comprising the combination with the track rope, of a suspension rod from a suitable overhead support, a track plate secured to the suspension rod and to the track rope, the edges of which track plate have an upwardly projecting ridge forming a track from the track rope around each side of the suspension rod, and means connected to the track plate suspension for releasing the side frame of a carriage movable on the track whereby the sheaves of each side of that carriage are free to move laterally apart and pass around the opposite edges of the track plate past the suspension means.

5. In an overhead wire rope system, means for suspending the track rope from its supports, said means comprising the combination with the track rope, of a suspension rod from a suitable overhead support, a track plate secured to the suspension rod and to the track rope, the edges of which track plate are downwardly flanged with an upwardly projecting ridge at the bend of the flange forming a track from the track rope around each side of the suspension rod, guard strips spaced apart from the track rope and around the tack plate on each side, which guard strips are supported from the track plate suspension, and means connected to the guard strip on one side for effecting release of the side frames of a carriage whereby the sheaves of that carriage are free to move apart and pass around the track plate.

6. In an overhead track wherein the track rope is medially suspended from overhead supports with provision permitting the carriage to pass around each side of the suspending means, grooved sheaves adapted to run on the track rope, a side frame suspended on each side of the rope from the axles of separate sheaves, a load bearing yoke pivotally connected to the side frames, means for securing the side frames together with the grooves of their sheaves in alinement with the track rope, and means on the track rope suspension for effecting release of the frame securing means and permitting the sheaves of each side frame to pass around the opposite sides of the track rope suspension.

In testimony whereof I affix my signature.

WILSON A. BROWNLEE.